United States Patent [19]

Niwa et al.

[11] Patent Number: 5,540,507
[45] Date of Patent: Jul. 30, 1996

[54] TAPE PRINTING APPARATUS

[75] Inventors: Akihiko Niwa; Hideo Ueno, both of Nagoya; Minako Ishida, Ama-gun; Mikako Bito, Nagoya, all of Japan

[73] Assignee: Brother Kogyo Kabushiki Kaisha, Nagoya, Japan

[21] Appl. No.: 350,140

[22] Filed: Nov. 29, 1994

[30] Foreign Application Priority Data

Dec. 1, 1993 [JP] Japan .................................. 5-338839

[51] Int. Cl.⁶ ............................................. B41J 3/46
[52] U.S. Cl. ............................ 400/83; 400/61; 395/110
[58] Field of Search ............................... 400/120.01, 83, 400/62, 61, 63; 395/110, 100, 101; 345/25, 26, 116, 141

[56] References Cited

U.S. PATENT DOCUMENTS

| | | |
|---|---|---|
| 5,066,152 | 11/1991 | Kuzuya et al. . |
| 5,188,469 | 2/1993 | Nagao et al. . |
| 5,222,818 | 6/1993 | Akiyama et al. ........................ 400/61 |
| 5,257,074 | 10/1993 | Kamei .................................... 395/110 |
| 5,314,256 | 5/1994 | Niwa ...................................... 400/61 |
| 5,322,375 | 6/1994 | Niwa et al. ............................. 400/61 |
| 5,374,132 | 12/1994 | Kimura .................................. 400/594 |

FOREIGN PATENT DOCUMENTS

| | | |
|---|---|---|
| 0497352 | 8/1992 | European Pat. Off. . |
| 0506460 | 9/1992 | European Pat. Off. . |
| 0574225 | 12/1993 | European Pat. Off. . |
| 1-85050 | 6/1989 | Japan . |
| 2-106555 | 4/1990 | Japan . |

OTHER PUBLICATIONS

"*Optimize Horizontal Accuracy When Processing Typographic Proportional Fonts*" Jun. 1991, vol. 34, No. 1, Armonk, US, pp. 272–274, XP 000210211.

*Primary Examiner*—John S. Hilten
*Attorney, Agent, or Firm*—Oliff & Berridge

[57] ABSTRACT

When a character key is operated, the apparatus reads display character size data for the inputted character, which corresponds to a selected print character size, in S40. Display dot pattern data corresponding to the starting character code in a text memory is then read out. The thus read out data is stored in the location designated by a display position pointer value of a display data buffer in S42. The print fullwidth data for the inputted character code is then read out in S43 so as to calculate the display fullwidth data for display in S44. The display fullwidth data is added to the display position pointer value to determine the next display position pointer value in S45. The display dot pattern data corresponding to the next character code is placed into the location designated by the next display position pointer value in S42.

10 Claims, 13 Drawing Sheets

| PRINT CHARACTER SIZE (pt) | CHAR-ACTER CODE | START ADDRESS OF PRINT DOT PATTERN DATA | FULL-WIDTH DATA (WD) | LEFT MARGIN DATA (Ly) |
|---|---|---|---|---|
| 6 (16 DOTS) | A | SA6A | WD6A | Ly6A |
| | B | SA6B | WD6B | Ly6B |
| | C | SA6C | WD6C | Ly6C |
| | D | SA6D | WD6D | Ly6D |

| PRINT CHARACTER SIZE (pt) | CHAR-ACTER CODE | START ADDRESS OF PRINT DOT PATTERN DATA | FULL-WIDTH DATA (WD) | LEFT MARGIN DATA (Ly) |
|---|---|---|---|---|
| 10 (14 DOTS) | A | SA10A | WD10A | Ly10A |
| | B | SA10B | WD10B | Ly10B |
| | C | SA10C | WD10C | Ly10C |
| | D | SA10D | WD10D | Ly10D |

| PRINT CHARACTER SIZE (pt) | CHAR-ACTER CODE | START ADDRESS OF PRINT DOT PATTERN DATA | FULL-WIDTH DATA (WD) | LEFT MARGIN DATA (Ly) |
|---|---|---|---|---|
| 13 (32 DOTS) | A | SA13A | WD13A | Ly13A |
| | B | SA13B | WD13B | Ly13B |
| | C | SA13C | WD13C | Ly13C |
| | D | SA13D | WD13D | Ly13D |

| PRINT CHARACTER SIZE (pt) | CHAR-ACTER CODE | START ADDRESS OF PRINT DOT PATTERN DATA | FULL-WIDTH DATA (WD) | LEFT MARGIN DATA (Ly) |
|---|---|---|---|---|
| 19 (48 DOTS) | A | SA19A | WD19A | Ly19A |
| | B | SA19B | WD19B | Ly19B |
| | C | SA19C | WD19C | Ly19C |
| | D | SA19D | WD19D | Ly19D |

FIG. 6B

| PRINT CHARACTER SIZE (dot) | CHAR-ACTER CODE | START ADDRESS OF DISPLAY DOT PATTERN DATA |
|---|---|---|
| 7 | A<br>B<br>C<br>⋮ | HSA7A<br>HSA7B<br>HSA7C |
| 10 | A<br>B<br>C<br>⋮ | HSA10A<br>HSA10B<br>HSA10C |
| 16 | A<br>B<br>C<br>⋮ | HSA16A<br>HSA16B<br>HSA16C |

TB3

⋮  ⋮  ⋮

TAPE PRINTING APPARATUS

BACKGROUND OF THE INVENTION

1. Field of the Invention

The present invention relates to a tape printing apparatus and, more particularly, to a tape printing apparatus for inputting desired characters, such as letters and symbols, displaying the inputted characters on a display for the operator's confirmation, and printing the inputted characters onto a tape.

2. Description of the Related Art

U.S. Pat. No. 5,066,152 has proposed a tape printing apparatus employed with a keyboard, a display unit and a print mechanism. Characters, such as letters and symbols, inputted through the keyboard are displayed on the display unit, while being printed, by the print mechanism, on a print medium housed in a tape cassette (e.g., a tape 18 or 24 mm wide). The tape printing apparatus is suitable for printing file names, for example, on the tape to make labels for classifying file binders.

More specifically, the display unit is similar to what is commonly used with word processors or the like. The characters inputted through the keyboard are displayed in matrix format in a predetermined character size (e.g., 16-dot size). The print character size, font and other format setting information are also displayed by the use of control characters ("F," etc.) The inputted characters are printed on the tape, in the print character size and in the font based on the format setting information.

SUMMARY OF THE INVENTION

The present inventors have motivated the idea of displaying on the display unit the characters inputted through the keyboard, exactly as they are to be printed on the tape, according to the predetermined font and print character size.

To implement the idea, the inventors have further motivated to store, in a nonvolatile memory, display dot pattern data for each of a plurality of characters inputtable through the input unit with regard to each of a plurality of dot-based display character sizes such as 7-, 10-, 16-dot, etc. sizes. The display dot pattern data for each of the plural characters of each display dot size may be obtained through reducing print dot pattern data of the corresponding character at a corresponding one of a plurality of print character sizes.

With such a proposed arrangement, every time a character is inputted, the display dot pattern data for the inputted character, of the display character size corresponding to a desired print character size, is displayed on the display unit, after being developed in a display image buffer.

The above-mentioned tape printing apparatus conceived by the inventors is therefore capable of print image display. However, according to this apparatus, when printing characters at a small print size, corresponding display dot pattern data should be prepared at a display character size of as small as 7 or 10 dots wide. With that small dot count, however, some alphabetic letters, such as "M" and "W", as well as some special symbols, that have large character widths cannot be expressed by use of the limited number of dots alone; they must be expressed using at least 10 or 12 dots, resulting in a character width larger than predetermined. When a character string containing such large-width characters is inputted, the arranged position of each character in the character string differs in a subtle but appreciable manner from the print position on the tape. The putative print image of the inputted character string as displayed on the display unit thus fails to correspond precisely with what is to be actually printed on the tape.

It is therefore an object of the present invention to provide a tape printing apparatus capable of displaying on a display unit a plurality of inputted characters in accurate correspondence with the print positions on the tape.

In order to attain the above object and other objects, the present invention provides a tape printing apparatus for printing desired characters onto a tape, the apparatus comprising: input means for inputting characters, such as letters and symbols, and various commands; data storage means for temporarily storing data indicative of the characters inputted through the input means; print character generator storing means for storing, in advance, for a plurality of print character sizes, print dot pattern data of a plurality of characters inputtable through the input means and print area data indicative of print areas dedicated to the corresponding characters; print dot image generating means for selecting, from the print character generator storing means, print dot pattern data for the inputted characters stored in the data storing means, in accordance with a print character size with which the inputted characters are desired to be printed on a tape, the print dot image generating means further selecting, also from the print character generator storing means, print area data for the inputted characters at the desired print character size so as to compose the selected print dot pattern data for the inputted characters into print dot image data where the inputted characters are arranged with a print character interval corresponding to the print area data; display character generator storing means for storing in advance, for a plurality of display character sizes, display dot pattern data of a plurality of characters inputtable through the input means; display dot image generating means for selecting, from the display character generator storing means, display dot pattern data for the inputted characters stored in the data storing means, in accordance with a desired display character size, the desired display character size being determined dependently on the desired print character size, the display dot image generating means further reading, from the print character generator storing means, the print area data for the inputted characters at the desired print character size, and obtaining display area data 10 for the inputted characters with respect to the desired display character size, the display dot image generating means composing the selected display dot pattern data for the inputted characters into display dot image data where the inputted characters are arranged with a display character interval which corresponds to the display area data and therefore which corresponds to the print character interval; display means for receiving the display dot image data so as to display a display dot image where the inputted characters are arranged with the display character interval; and print means for receiving the print dot image data and for printing, on a tape, the print dot image where the inputted characters are arranged with the print character interval.

According to another aspect, the present invention provides a tape printing apparatus for printing desired characters onto a tape, the apparatus comprising: input means for inputting characters, such as letters and symbols, desired to be printed on a tape, and a desired print character size, with which the inputted characters are desired to be printed on the tape; data storage means for temporarily storing data indicative of the characters inputted through the input means; print character data storing means for storing, in advance, for a plurality of print character sizes, print pattern data of a plurality of characters inputtable through the input means and print area data indicative of print areas dedicated to the corresponding characters; print area data selecting means for selecting, from the print character data storing means, print area data for the inputted characters at the desired print character size; print image generating means for selecting, from the print character data storing means, print pattern data for the inputted characters stored in the data storing means, in accordance with the desired print character size, the print image generating means composing the selected print pattern data for the inputted characters into print image data where the inputted characters are arranged at positions determined dependently on the selected print area data; display character data storing means for storing in advance, for a plurality of display character sizes, display dot pattern data of a plurality of characters inputtable through the input means; display character size setting means for setting one of the plurality of display character sizes in correspondence with the desired print character size; display area data calculating means for calculating display area data for each of the inputted characters with respect to the set display character size, the display area data for each inputted character indicating a display area which should be dedicated to the corresponding character at the corresponding display character size for displaying, the display area data for the each inputted character being calculated based on the selected print area data for the corresponding character and relationship between the desired print character size and the set display character size; display image generating means for selecting, from the display character data storing means, display pattern data for the inputted characters stored in the data storing means, in accordance with the set display character size, the display image generating means composing the selected display pattern data for the inputted characters into display image data where the inputted characters are arranged at positions determined dependently on the calculated display area data; display means for receiving the display image data so as to display a display image where the inputted characters are arranged at the positions corresponding to the calculated display area data; and print means for receiving the print image data and for printing, on the tape, the print image where the inputted characters are arranged at the positions corresponding to the selected print area data.

According to a further aspect, the present invention provides a tape printing apparatus for printing desired characters onto a tape, the apparatus comprising: input means for inputting characters, such as letters and symbols, and various commands; data storage means for temporarily storing data indicative of the characters inputted through the input means; print character generator storing means for storing, in advance, for a plurality of print character sizes, print dot pattern data of a plurality of characters inputtable through the input means and print area data indicative of print areas dedicated to the corresponding characters; display character generator storing means for storing in advance, for a plurality of display character sizes, display dot pattern data of a plurality of characters inputtable through the input means; display dot image generating means for selecting, from the display character generator storing means, display dot pattern data for the inputted characters stored in the data storing means, in accordance with a desired display character size, the desired display character size being determined dependently on the desired print character size, the display dot image generating means further reading, from the print character generator storing means, the print area data for the inputted characters at the desired print character size, and obtaining display area data for the inputted characters with respect to the desired display character size, the display dot image generating means composing the selected display dot pattern data for the inputted characters into display dot image data where the inputted characters are arranged with a display character interval which corresponds to the display area data; display means for receiving the display dot image data so as to display a display dot image where the inputted characters are arranged with the display character interval; and print means for receiving the print dot pattern data for the inputted characters and for printing, on a tape, a print dot image where the inputted characters are arranged with a print character interval corresponding to the print area data for the inputted characters.

BRIEF DESCRIPTION OF THE DRAWINGS

The above and other objects, features and advantages of the invention will become more apparent from reading the following description of the preferred embodiment taken in connection with the accompanying drawings in which:

FIG. 6A shows settings of an index table TB2;

FIG. 6B shows settings of an index table TB3;

DETAILED DESCRIPTION OF THE PREFERRED EMBODIMENT

Figure 1:
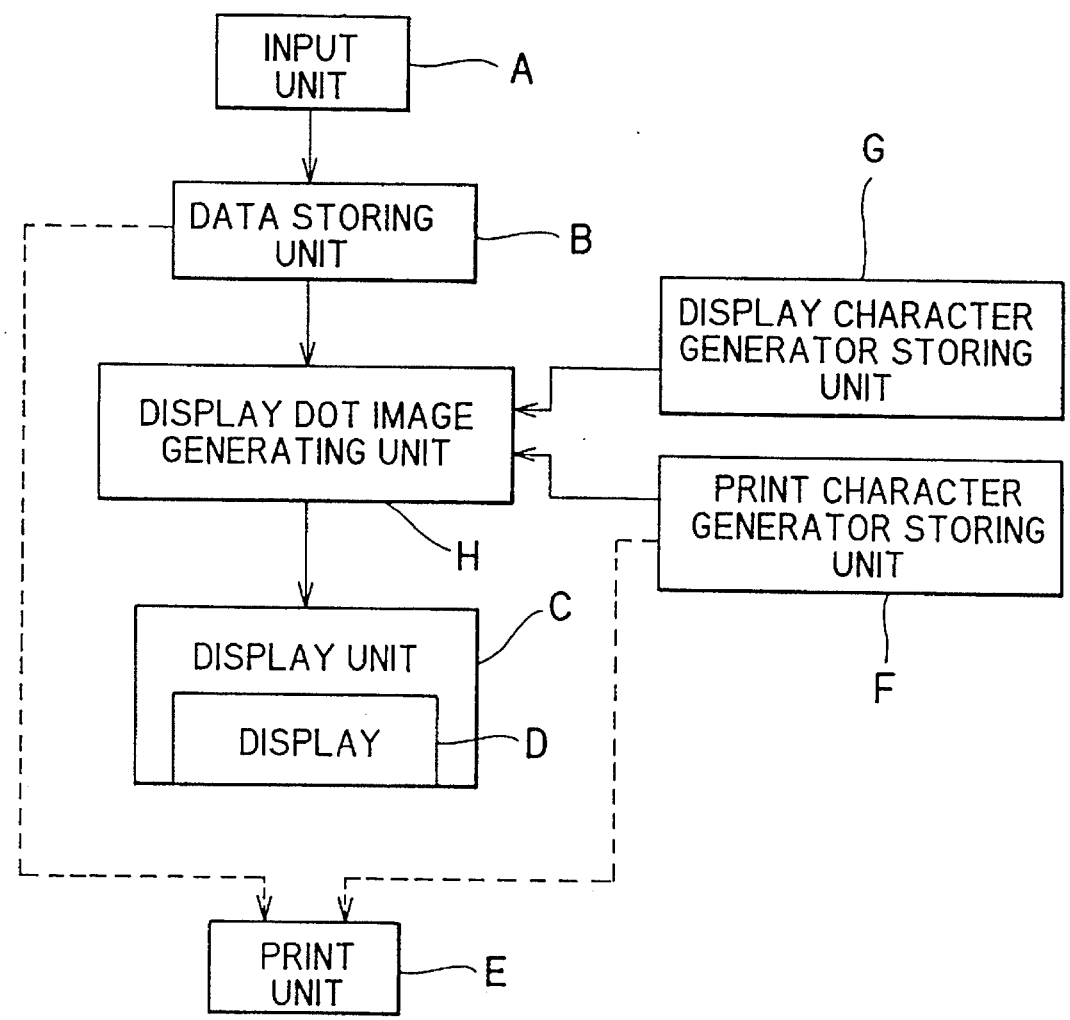
FIG. 1 is a block diagram showing a structure of a tape printing apparatus of an embodiment of the present invention.

A tape printing apparatus according to a preferred embodiment of the present invention will be described while referring to the accompanying drawings wherein like parts and components are designated by the same reference numerals to avoid duplicating description.

The tape printing apparatus according to the preferred embodiment of the present invention has, as shown in a function block diagram of FIG. 1, an input unit A, a data storage unit B, a display unit C with a display D, a print unit E, a print character generator storing unit F, a display character generator storing unit G, and a display dot image generating unit H. The input unit A is for inputting characters, such as letters and symbols, and various commands. The data storing unit B is for temporarily storing data indicative of the characters inputted through the input unit A. The print character generator storing unit F is for storing in advance, for each of a plurality of print character sizes, print dot pattern data for a plurality of characters inputtable through the input unit A and print area data indicative of print widths of dedicated areas therefor. The display character generator storing unit G is for storing in advance, for each of a plurality of display character sizes, display dot pattern data of a plurality of characters inputtable through the input unit A.

The print unit E is provided with a print head made of a plurality of dot print elements. The print unit E reads, from the print character generator storing unit F, print dot pattern data for the inputted characters stored in the data storing unit B, in accordance with a print character size with which the inputted characters are desired to be printed on a tape. The print unit E further reads, also from the print character generator storing unit F, the print area data for the inputted characters at the desired print character size. The print unit E then composes the read out print dot pattern data for the inputted characters into print dot image data where the inputted characters are arranged with an appropriate print character interval or pitch determined dependently on the display area data. The print unit E drives the print head in accordance with the print dot image data to print the composite image of the inputted characters.

The display dot image generating unit H reads, from the display character generator storing unit G, display dot pattern data for the inputted characters stored in the data storing unit B, in accordance with a display character size, the display character size being determined dependently on a desired print character size. The display dot image generating unit H further reads, from the print character generator storing unit F, the print area data for the inputted characters at the desired print character size, and obtains display area data with respect to the determined display character size. The display dot image generating unit H composes the read out display dot pattern data for the inputted characters into display dot image data where the inputted characters are arranged with an appropriate display character interval or pitch which corresponds to the display area data and therefore which corresponds to the print character pitch, with which the print unit E prints the inputted characters onto the tape. The display unit C receives the display dot image data of the inputted characters and displays a dot image of the composite image of the inputted characters.

With the above-described structure, the inputted characters are displayed based on the display dot pattern data for the display character size corresponding to the desired print character size. The display character interval or pitch is suitably determined dependently on the display area data that is obtained by converting, in correspondence with the display character size, the print area data for the print dot pattern data of the desired print character size. The print-like images of the inputted characters are thus displayed on the display unit in precise correspondence with the actual print positions of these characters and symbols on the tape.

The print area data stored in the print character generator storing unit F for each character of each print character size may include full-width data indicative of the total width of the width of the corresponding character and widths of left- and right-hand margins to be printed for the corresponding character.

A concrete example of the present embodiment of the invention will now be described with reference to FIGS. 2 through 15.

The example is a tape printer capable of printing various characters, including alphanumeric letters and symbols, onto a print tape.

Figure 2:
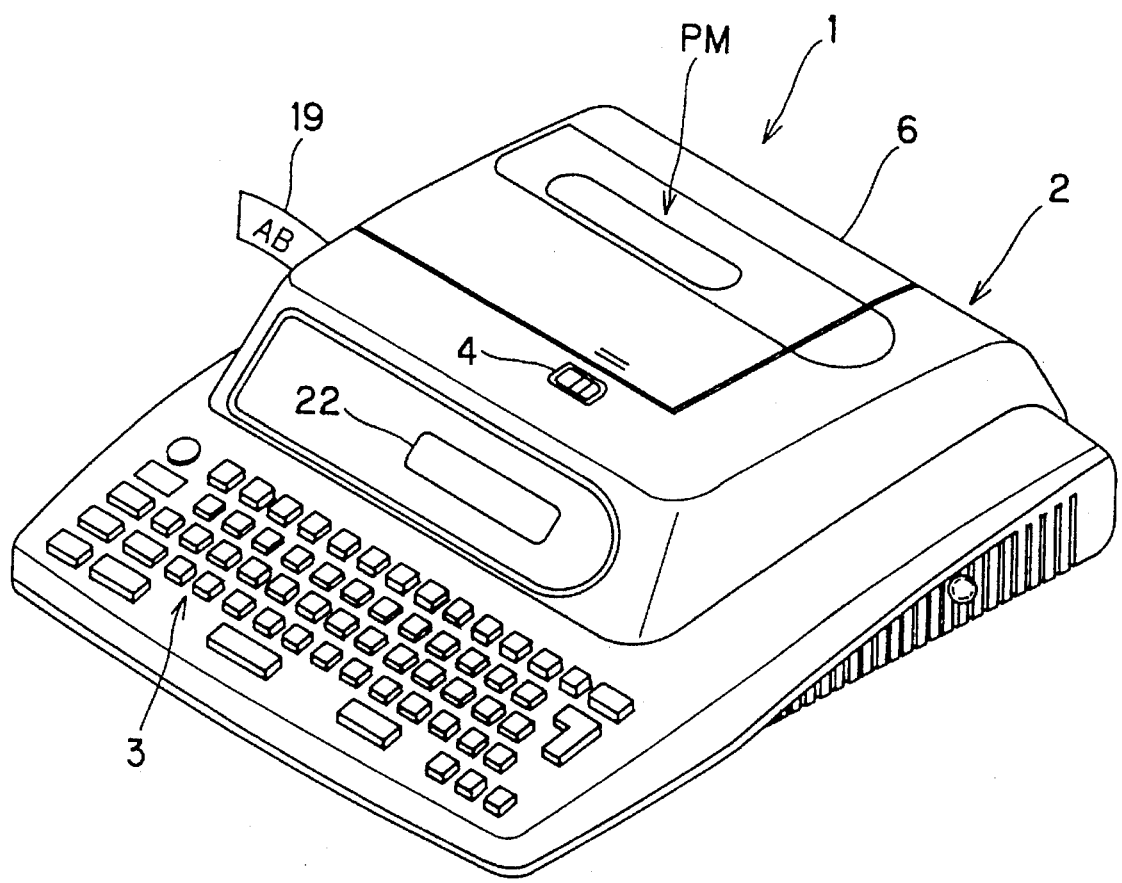
FIG. 2 is a perspective view of a tape printer of an example of the embodiment.

As shown in FIG. 2, a keyboard 3 is disposed in front of a body frame 2 of a tape printing apparatus 1, a printing mechanism PM is provided at the rear of the keyboard 3 and within the body frame 2, and a liquid crystal display 22 capable of displaying inputted characters as print-like images is disposed just behind the keyboard 3. The display unit 22 has a screen composed of 32 dots high and 121 dots long. Reference numeral 4 denotes a release button for opening a cover frame 6 when a tape containing cassette CS, to be loaded in the printing mechanism PM, is put in or removed.

On the keyboard 3, there are arranged such keys as character keys for inputting code data of characters, such as alphanumeric letters and symbols constituting a text desired to be printed, a space key, a return key, cursor moving keys for moving a cursor K rightwardly, leftwardly, upwardly, and downwardly, a print character size setting key for setting a print character size with which the inputted characters are desired to be printed, a print key for instructing printing operation, and a power key for turning power on/off.

Figure 3A:
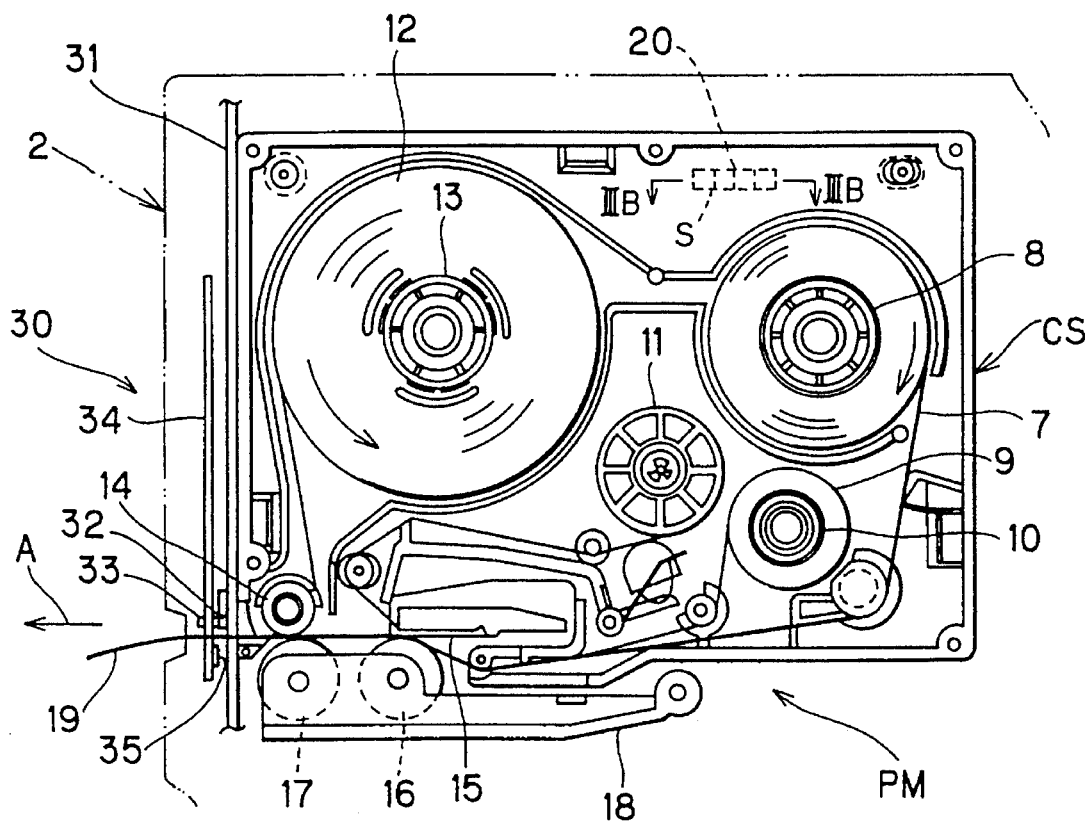
FIG. 3A is a schematic plan view of a print mechanism employed in the tape printer, with a tape cassette loaded therein.

Referring to FIG. 3A, the printing mechanism PM will be described in detail. The rectangular, tape containing cassette CS is removably loaded in the printing mechanism PM. Within the tape containing cassette CS, there are rotatably provided a tape spool 8 around which a transparent laminate film 7 is wound, a ribbon supply spool 10 around which a print ribbon 9 is wound, a take-up spool 11 for taking up the print ribbon 9, a supply spool 13 around which a double coated tape 12 with the same width as the laminate film 7 is wound with its peeling paper on the outside, and a joining roller 14 for causing the double-coated tape 12 to adhere to the laminate film 7. The double-coated tape 12 is a tape having adhesive layers formed on both sides of its base tape and having peeling paper attached to the adhesive layer on one side.

A thermal head 15 is installed upright in the position where the laminate film 7 and the print ribbon 9 overlap each other. A platen roller 16 for pressing the laminate film 7 and the print ribbon 9 against the thermal head 15 and a feed roller 17 for pressing the laminate film 7 and the double coated tape 12 against the joining roller 14 to thereby form the print tape 19 are pivotally supported for rotation on a support member 18 which is pivotally mounted for rotation on the body frame 2. On the thermal head 15, there is provided a group of heating elements formed of a train of 128 heating elements arranged in the vertical direction.

Accordingly, when electric current is passed through the heating elements while the joining roller 14 and the take-up spool 11 are driven in their predetermined rotating directions in synchronism with each other by rotation of a tape feed motor 45 (refer to FIG. 4) in its predetermined rotating direction, characters, symbols, and bar codes are printed on the laminate film 7 with plural trains of dots. Then, the double coated tape 12 is attached to the laminate film 7 and the tape is fed, as the print tape 19, in the tape feeding direction A to be discharged from the body frame 2 as shown in FIGS. 2 and 3A. Details of the printing mechanism PM are described in U.S. Pat. No. 5,188,469, the disclosure of which is hereby incorporated by reference.

Referring now to FIG. 3A, a manual cutting mechanism 30 for cutting the print tape 19 will be described in detail below. Just inside the body frame 2, there is provided a plate-formed auxiliary frame 31 in upright position and a stationary blade 32 is fixedly attached to the auxiliary frame 31 so as to face in an upward direction. An operating lever 34 extended in the direction from front to rear is supported for rotation, at its portion closer to the front end, on a pivot shaft 33 fixedly attached to the auxiliary frame 31. A movable blade 35 is fixedly attached to the operating lever 34 in front of the pivot shaft 33 such that it opposes the stationary blade 32. The rear end portion of the operating lever 34 is structured in a vertically swinging fashion by the use of a swing drive mechanism, not shown, coupled to a cutting motor 46 shown in FIG. 4. Normally, the movable blade 35 is held apart from the stationary blade 32.

The print tape 19 having a document printed thereon passes through the space between the stationary blade 32 and the movable blade 35 and sticks out of the body frame 2. Then, a cut signal drives the cutting motor 46 to cause the swing drive mechanism vertically to swing the rear end of the operation level 34. The swinging motion causes the moving blade 35 to approach the fixed blade 32, cutting the print tape 19.

As the print tape 19 to be fed from the tape containing cassette CS (i.e., the double-coated tape 12 and the laminate film 7 mounted in the cassette CS), there are provided those of five tape widths, 6 mm, 9 mm, 12 mm, 18 mm, and 24 mm. On the bottom wall of each tape containing cassette CS, there is provided a projecting piece 20. The projecting piece 20 formed on each tape cassette CS is for indicating a tape width of a tape 19 to be obtained from the tape cassette CS, i.e., the width of the double-coated tape 12 and the laminate film 7 mounted in the cassette CS. Because the width is one of the five tape widths, the projecting piece 20 formed on each tape cassette CS is formed with four projecting claws, for distinguishing in combination one from the five tape widths.

Figure 3B:
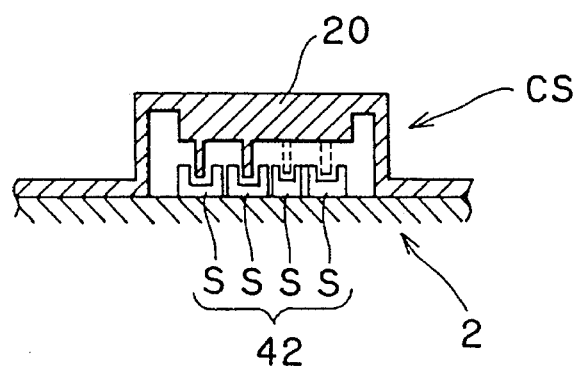
FIG. 3B is a schematic sectional view taken along a line IIIB—IIIB of FIG. 3A.

As shown in FIG. 3B, on the body frame 2, there is provided a cassette sensor 42 at a position capable of confronting the projecting piece 20 when the tape cassette CS is loaded in the printing mechanism portion PM. The cassette sensor 42 is for detecting the condition of the projecting claws of the projecting piece 20 to thereby detect the tape width of a tape 19 to be obtained from the tape cassette CS actually loaded in the printing mechanism portion PM.

As shown in FIG. 3B, the cassette sensor 42 is made from four photocouplers S, each having a light-emitting diode paired with a photodetector. Each of the four photocouplers is located at a position capable of receiving a corresponding one of the four projecting claws of the projecting piece 20. Each photosensor therefore detects whether or not the corresponding projecting claw is inserted between the light-emitting diode and the photodetector. Illustratively, the cassette sensor 42 outputs a cassette signal "0100" for a tape width of 24 mm, a cassette signal "1100" for a tape width of 12 mm, or a cassette signal "0000" for the absence of a tape cassette CS.

Figure 4:
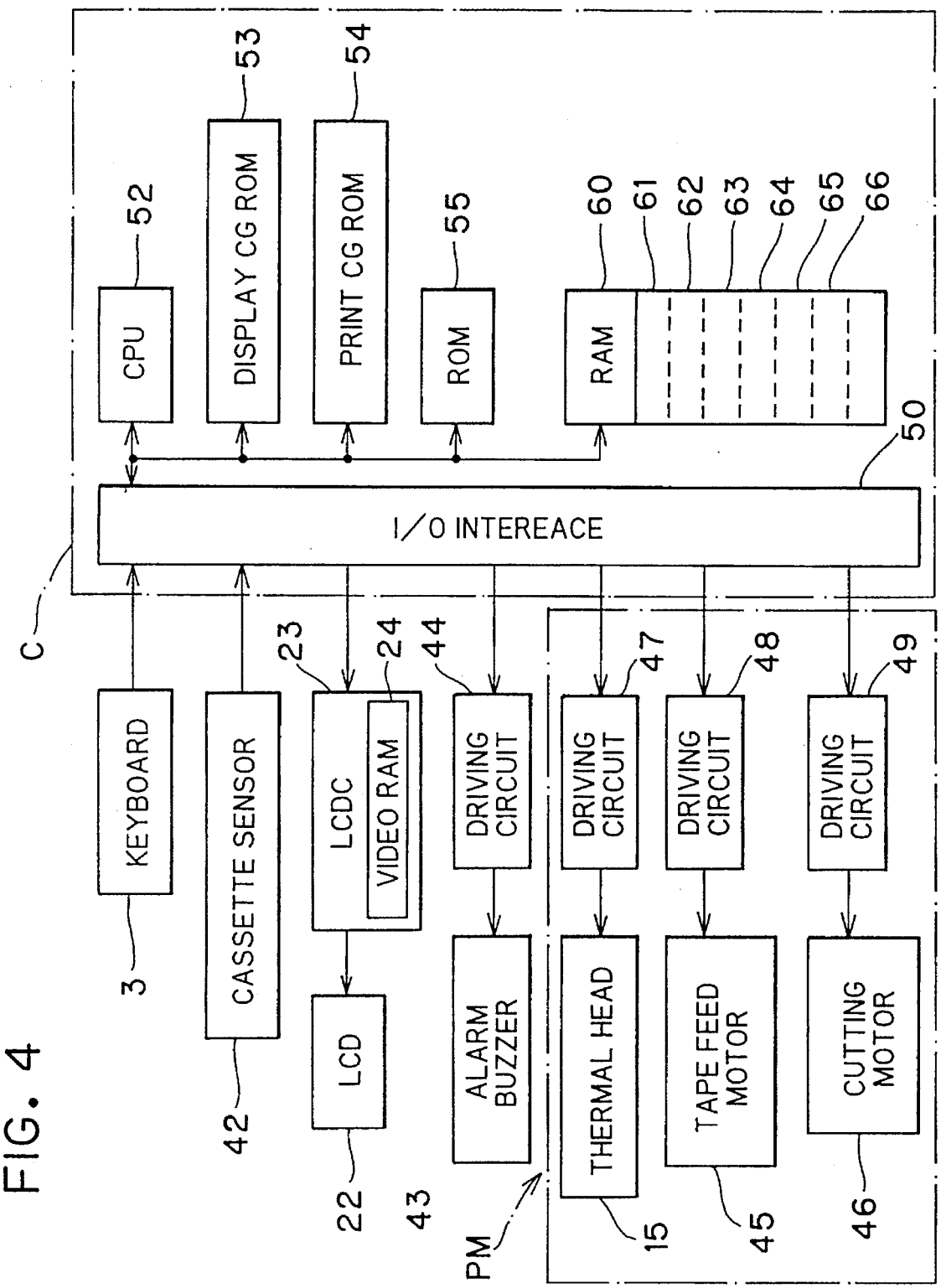
FIG. 4 is a block diagram of the control system in the tape printer.

The control system of the tape printing apparatus 1 is constituted as shown in the block diagram of FIG. 4.

An I/O interface 50 of a control unit C is connected to the keyboard 3, the cassette sensor 42, an LCD controller 23, with a video RAM 24, for outputting display data to the LCD unit 22, a driving circuit 44 for activating an alarm buzzer 43, a driving circuit 47 for driving the thermal head 15, a driving circuit 48 for driving the tape feed motor 45, and a driving circuit 49 for driving the cutting motor 46.

The control unit C includes a CPU 52, and an I/O interface 50, a display CG (character generator) ROM 53, a print CG (character generator) ROM 54, a ROM 55 and a RAM 60 which are connected to the CPU 52 via a bus 51 such as a data bus.

The display CGROM 53 stores display dot pattern data with respect to code data of each of a plurality of characters, such as alphanumeric letters and symbols, at each of five display character sizes (7, 10, 16, 21 and 32 dots) for each of a plurality of fonts (Gothic, Ming, etc. )

The print CGROM 54 stores print dot pattern data with respect to code data of each of a plurality of characters, such as alphanumeric letters and symbols, of each of six print character sizes (6-point 16-dot, 10-point 24-dot, 13-point 32-dot, 19-point 48-dot, 26-point 64-dot, and 38-point 96-dot sizes) for each of the plural fonts.

The ROM 55 stores a display drive control program, a print drive control program and a tape print control program. The display drive control program is for controlling the LCD controller 23 in response to display dot image data prepared based on the code data of characters inputted from the keyboard 3. The print drive control program drives the thermal head 15 and tape feed motor 45 while consecutively retrieving print dot image data from a print data buffer 66. The tape print control program is specific to this invention and will be described later in more detail.

Figure 5:
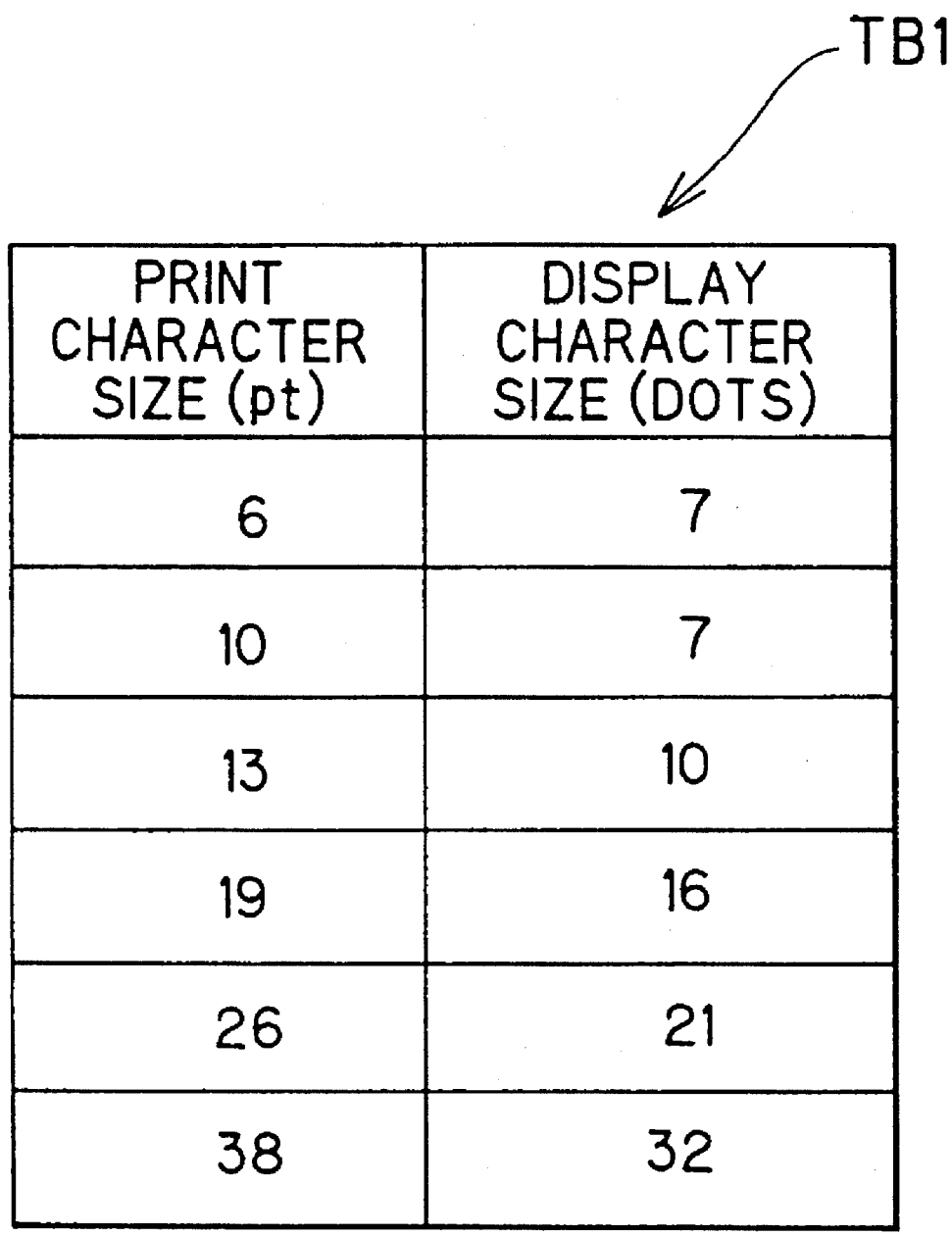
FIG. 5 shows settings of a character size conversion table TB1.

As shown in FIG. 5, the ROM 55 further stores a character size conversion table TB1 for indicating which one of the five display character sizes should be used when each one of the six print character sizes is selected for printing, as shown in FIG. 5.

Figure 10:
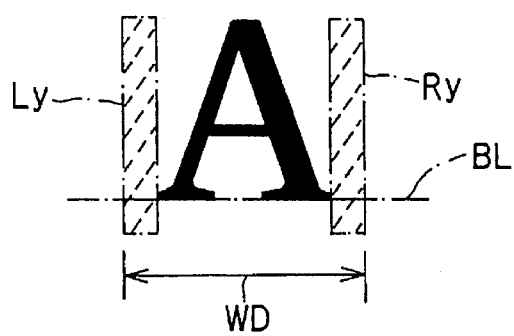
FIG. 10 illustrates print dot pattern data and fullwidth data about a character "A," for example.

As depicted in FIG. 6A, the ROM 55 further stores a first index table TB2. Stored in the first table TB2, in a grouped manner for each of the six print character sizes, are the code data of the plural characters inputtable through the keyboard 3, data indicating start addresses in the print CGROM 54 at which print dot pattern data for the corresponding characters are stored, print fullwidth data WD indicating the total widths of the widths of the corresponding characters to be printed and widths of left and righthand margins to be produced for the corresponding characters, and print left margin data Ly indicating the widths of the left margins to be produced for the corresponding characters. For example, as shown in FIG. 10, the print dot pattern data for the character "A" represents the area painted black; the print fullwidth data WD for the character "A" denotes the total width of the width of the character itself (black-painted area) and the widths of its margins Ly and Ry to be provided on both sides of the character "A" (black-painted area) as shaded with dotted lines; and the print left margin data Ly represents the width of the left margin. Reference characters BL stand for a base line.

Thus, the print fullwidth data WD for each character represents a print area dedicated to a corresponding character. In other words, in the example of FIG. 10, only the character "A" can be printed in the print area indicated by the print fullwidth data WD for the character "A."

As depicted in FIG. 6B, the ROM 55 further stores a second index table TB3. Stored in the table TB3, in a grouped manner for each of the five display character sizes, are the code data of the plural characters inputtable through the keyboard 3 and data indicating start addresses in the display CGROM 53 at which display dot pattern data for the corresponding characters are stored.

A text memory 61 in the RAM 60 temporarily stores text data inputted from the keyboard 3. A pointer buffer 62 stores a text pointer value TP for designating an address in the text memory 61, a display position pointer value DP for specifying a dot pattern developing position in the print direction inside a display data buffer 65, and a print position pointer value PP for specifying a dot pattern developing position in the print direction inside a print data buffer 66. A print character size memory 63 stores data of an operator's selected print character size. A display character size memory 64 stores data of a display character size calculated. The display data buffer 65 stores a composite display dot pattern data for a plurality of inputted characters. The print data buffer 66 stores a composite print dot pattern data for the plurality of characters inputted to be printed.

Figure 7:
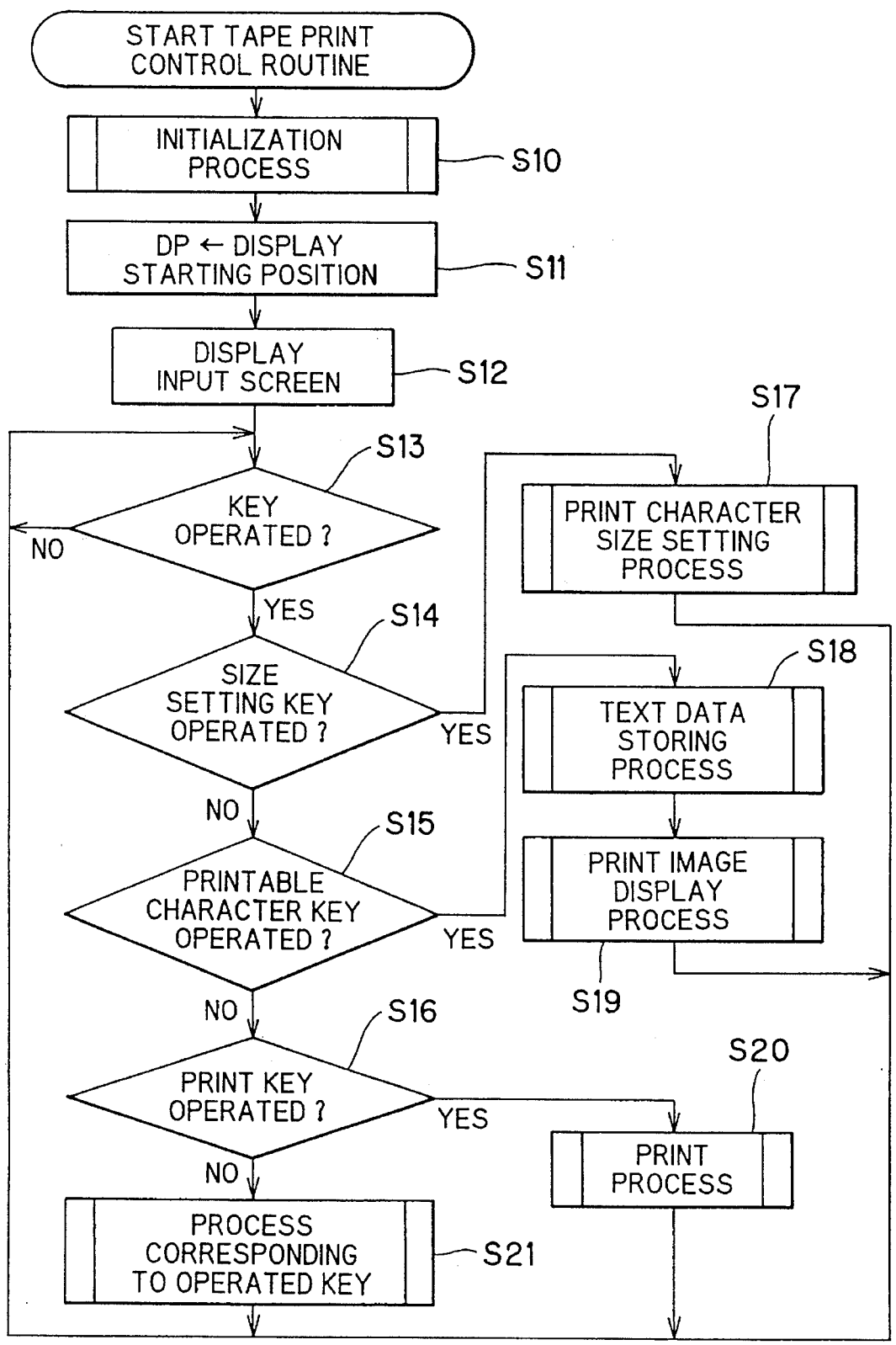
FIG. 7 is a flowchart of the steps constituting the tape print control routine.

The tape print control routine executed by the control unit C of the tape printing apparatus 1 is described below with reference to the flowcharts in FIGS. 7 through 9. In the figures, reference numerals Si (i=10, 11, 12, etc.) represent steps. 10 As shown in FIG. 7, operating the power key on the keyboard 3 starts the control routine. First, the control clears the memories 61 through 66 in the RAM 60 and initialize the print mechanism PM in S10. An initial value is then set to the display position pointer value DP in the pointer buffer 62 in S11. After this, the display unit 22 displays a screen for inputting text data, in S12. A cursor K appears on the text input screen according to the display position pointer value DP.

Figure 8:
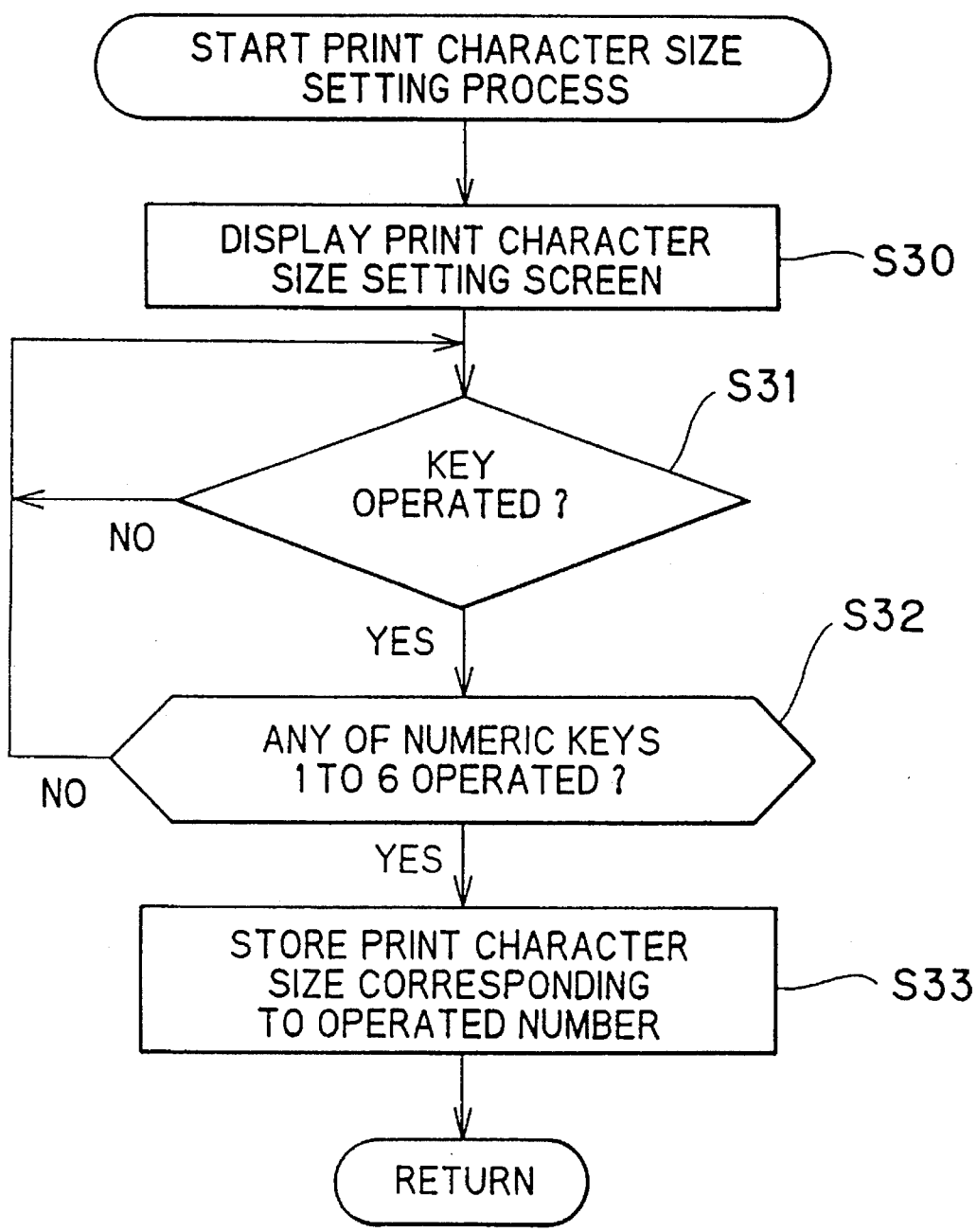
FIG. 8 is a flowchart of the steps constituting the print character size setting process.

When a size setting key is operated by an operator ("YES" in steps 13 and 14), a print character size setting process of FIG. 8 is carried out in S17.

As shown in FIG. 8, when the print character size setting process starts, a print character size setting screen is displayed on the display unit 22 in S30. Illustratively, the print character size setting screen indicates numerals 1 through 6 associated with the six point sizes. When one of the numeric keys 1 through 6 is operated ("YES" in steps 31 and 32), the data of a print character size corresponding to the selected numeral is stored into the print character size memory 63 in S33. This completes the print character size setting process, and control returns to S13 of the tape print control routine of FIG. 7.

When any of the printable character keys, such as alphanumeric letter keys and symbol keys, is operated ("YES" in step 13, "NO" in step 14, "YES" in step 15), a text data input process is carried out, whereby code data corresponding to the operated printable character key is stored into the text memory 61 of the RAM 60 as text data in S18. The text data input process is followed by a print image display process of S19, whereby the data in the text memory 61 is displayed, as shown in FIG. 9.

Figure 9:
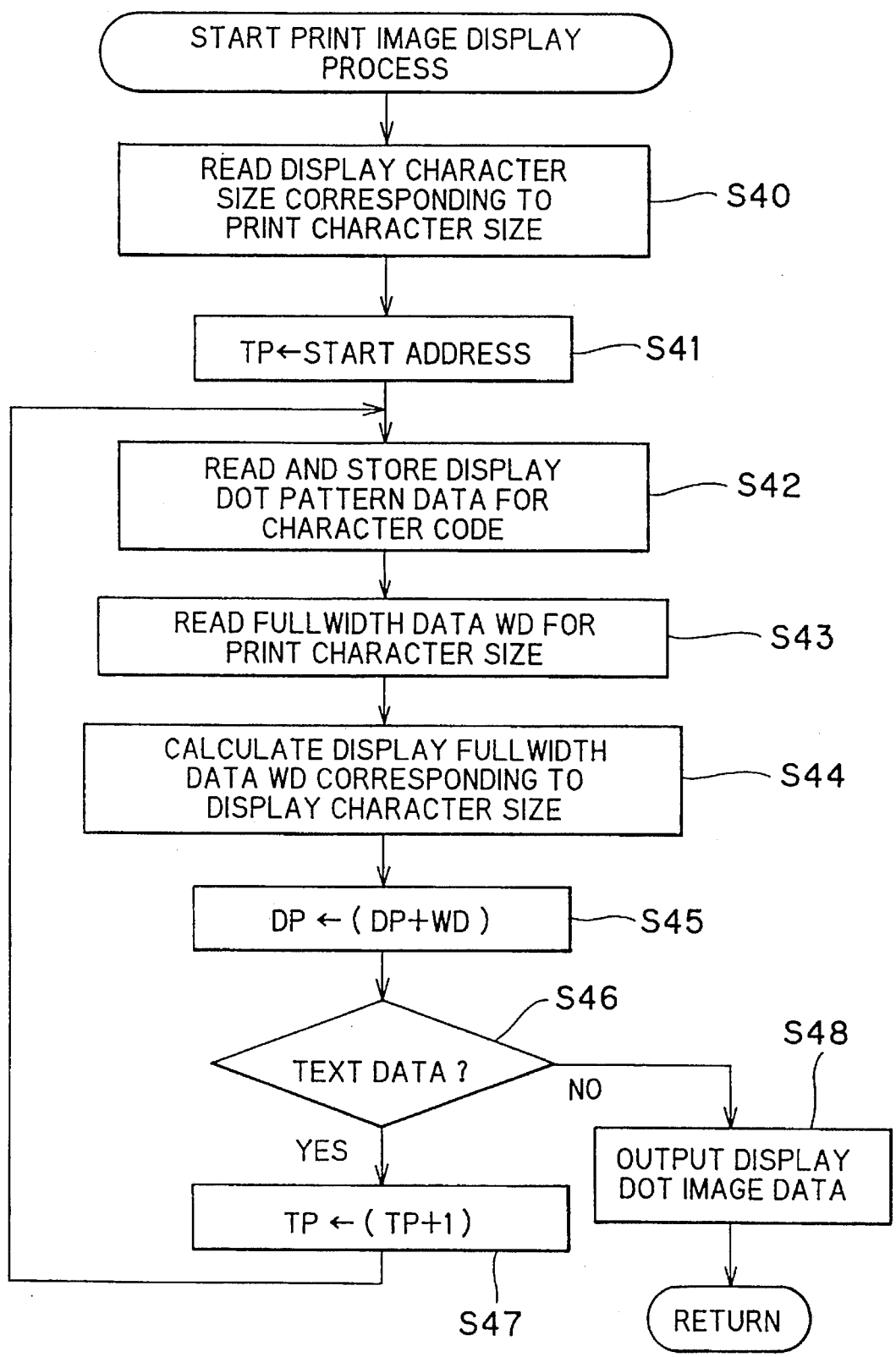
FIG. 9 is a flowchart of the steps constituting the print image display process.

As shown in FIG. 9, when the print image display process starts, display character size data corresponding to the selected print character size is read out from the character size conversion table TB1, in accordance with the data now stored in the print character size memory 63, in S40. The start address of the text memory 61 is then set as the text pointer value TP in S41. The start address of the display dot pattern data for the character code, stored in the text memory 61 at the address designated by the text pointer value TP, is read out from the index table TB3 on the basis of the display character size data. Then, the display dot pattern data is read out from the display CGROM 53 from its start address, and stored into the display data buffer 65 at the location determined based on the display position pointer value DP in S42.

The print fullwidth data WD corresponding to the character code is then read out from the index table TB2, in accordance with the set print character size data, in S43. A display fullwidth data wd for display of the character associated with the display character size is calculated, based on the retrieved print fullwidth data WD, the print character size and the display character size, in S44. Illustratively, when the alphabetic letter "A" is inputted and when the print character size is set to 10 point (24 dot) size, the display character size should be set to 7 dots according to TB1. In this case, the print fullwidth data WD10A retrieved from the TB2 is multiplied by a reduction ratio "7/24", whereby a display fullwidth data wd of a value [(7×WD10A)/24] is obtained. The display fullwidth data wd thus obtained for the character represents display area dedicated to the corresponding character in displaying. Accordingly, in this example, only the character "A" can be displayed within the display area indicated by the display fullwidth data wd of the value [(7×WD10A)/24].

The display fullwidth data wd is added to the display position pointer value DP to obtain a new display position pointer value DP for the next display position in S45. If any data unprocessed for image display remains in the text memory 61 ("YES" in S46), the text pointer TP is incremented by 1 in S47, and control returns to S42. When all the data stored in the text memory 61 have been processed for image display ("NO" in S46), the dot image data stored in the display data buffer 65 are outputted to the video RAM 24 for display onto the display unit 22 in S48. This completes the print image display process, and control returns to S13 of FIG. 7.

Figure 11:
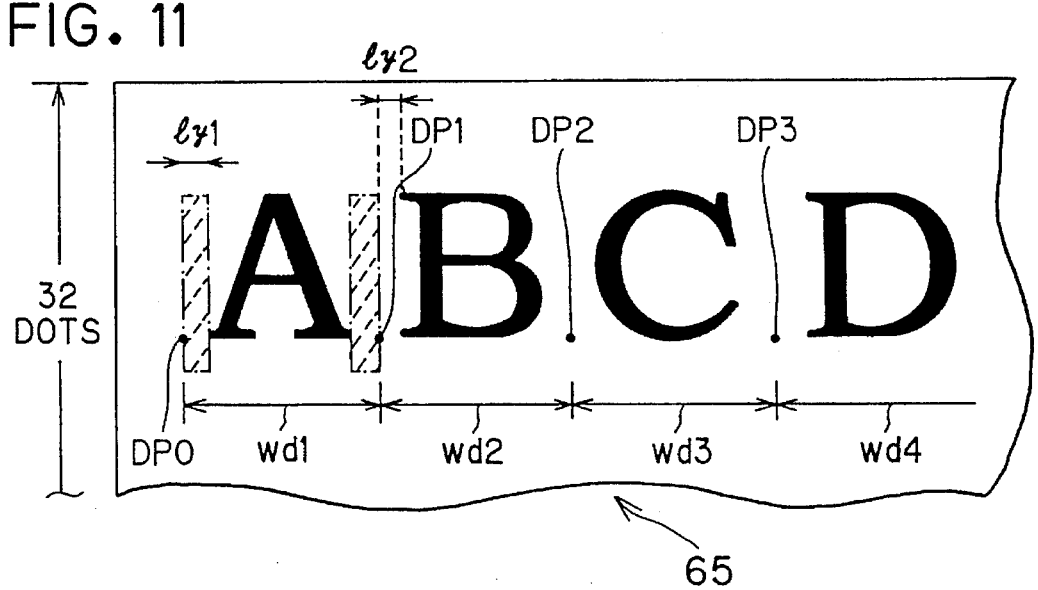
FIG. 11 illustrates an example of the content of a display data buffer storing display dot pattern data for an inputted character string.

Assume now that the print character size is set to 13 points and that an alphabetic letter string "ABCD" is inputted, for example. In that case, the character codes associated with these characters are first stored into the text memory 61. Because the character size conversion table TB1 indicates that the display character size of 10 dot should be selected for the print character size of 13 points, display dot pattern data for the character "A" of the 10 dot display character size is read out from the CGROM 53. As shown in FIG. 11, thus obtained display dot pattern data is stored into the display data buffer 65 according to a display start position designated by the display position pointer value DP0. The display fullwidth data wd1 for this character "A" obtained based on the print fullwidth data WD1 as per the reduction ratio associated with the set print character size with the corresponding display character size, is added to the display position pointer value DP0. This in turn allows the next display position pointer value DP1 to be obtained.

Then, display dot pattern data for the next character "B" is retrieved from the CGROM 53 and stored into the display data buffer 65 in accordance with a position designated by the display position pointer value DP1. The display fullwidth data wd2 for the character "B" is then added to the display position pointer value DP1 to obtain a next display position pointer value DP2. Thereafter and in like manner, display dot pattern data for the character "C" is retrieved from the CGROM 53 and stored into the display data buffer 65 according to a position designated by the display position pointer value DP2, and the display dot pattern data for the character "D" is retrieved from the CGROM 53 and stored into the data buffer 65 in accordance with a next display position pointer value DP3.

As described already, the display fullwidth data wd for each character represents display area dedicated to the corresponding character. Accordingly, in this example, only the display dot pattern data of character "A" is stored within the display area indicated by the display fullwidth data wd1 between the display positions DP0 and DP1. Similarly, only the data of character "B" is stored within the display area indicated by the display fullwidth data wd2 between the display positions DP1 and DP2.

It is noted that a left margin ly is formed between each character data and the corresponding display position DP. The width ly of this left margin for each character is obtained based on the print left margin data Ly, stored in the table TB2, as per the reduction ratio associated with the set print character size with the corresponding display character size. In this example of FIG. 11 where the print character size is set to 13 point (32 dot) size and therefore the corresponding display character size is 10 dot, a left margin ly2 for the alphabetic letter "B", for example, has a value obtained through multiplying the print left margin data Ly13B by a reduction ratio "10/32". Accordingly, the left margin ly2 of a value [10×Ly13B/32] is formed between the display position DP1 and the character "B".

Figure 12:
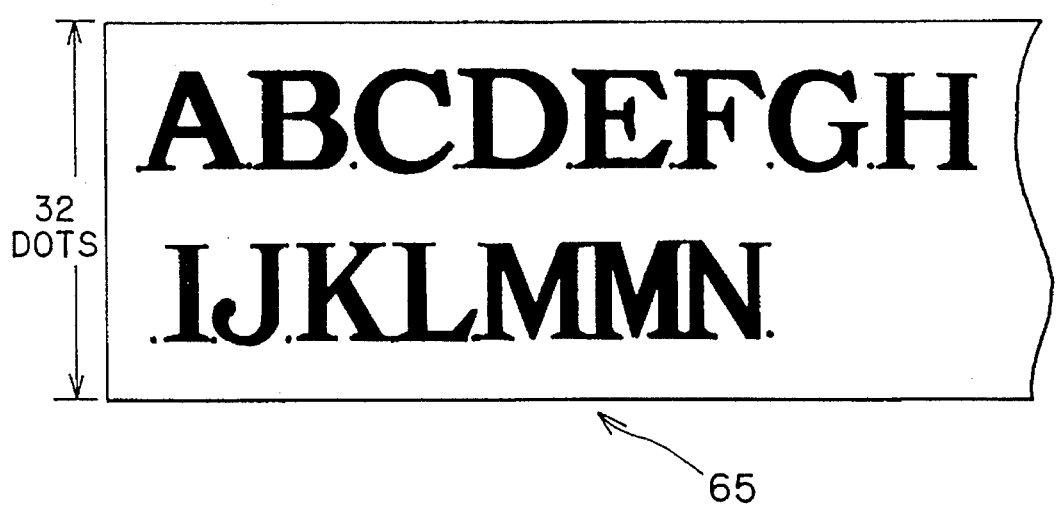
FIG. 12 illustrates an example of the content of the display data buffer storing dot pattern data for inputted two character strings.
Figure 13:
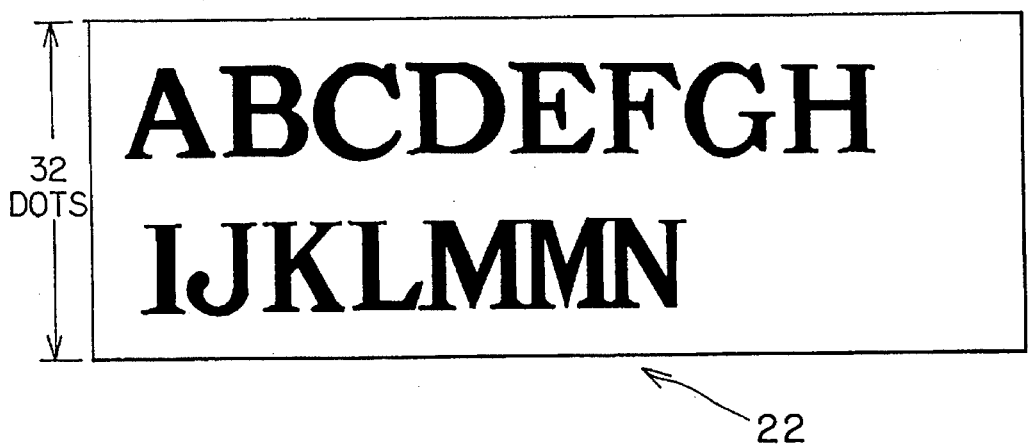
FIG. 13 illustrates how the display displays the inputted two character strings.

When two lines of character strings "ABCDEFGH" and "IJKLMMN" are inputted and 13 point print character size is set, display dot pattern data of 10 dot size are composed for all the characters, as shown in FIG. 12, with character intervals or pitches being determined dependently on the display fullwidth data wd on all the characters. The thus composed display dot pattern data are stored in the display data buffer 65. Referring to FIG. 12, the display position for each character is indicated by a point. It should be noted that a character "M" cannot be fully expressed in this small 10 dot character structure and therefore is composed approximately of a 12 dot structure. Although the character "M" therefore has a somewhat expanded width, because its position is determined dependently on the display fullwidth data wd which completely corresponds to the print fullwidth data WD, a gap or space obtained between the character "M" and the character following it becomes slightly smaller than those between other characters within the buffer. Accordingly, it appears that the characters "M" and the character following them are somewhat crowded together, in comparison with other characters. However, because the pitches or intervals between the characters are completely determined dependently on the display fullwidth data wd, the total arrangement of the characters is completely the same with that of the characters which is to be determined completely dependently on the print fullwidth data WD. Dot image data of the composite image of the character strings thus prepared in the display data buffer 65 is displayed as shown in FIG. 13 on the display unit 22.

As shown in FIG. 7, with the tape print control routine in operation, pressing the print key ("YES" in S13, "NO" in S14 and S15, "YES" in S16) executes a print process in S20. The print process is followed by return to S13.

In the print process, the print dot pattern data corresponding to each character code in the text memory 61 is read out from the print CG ROM 54. The print dot pattern data thus read is placed successively into the print data buffer 66 according to the positions arranged as per the print fullwidth data WD for the character codes involved.

Figure 16:
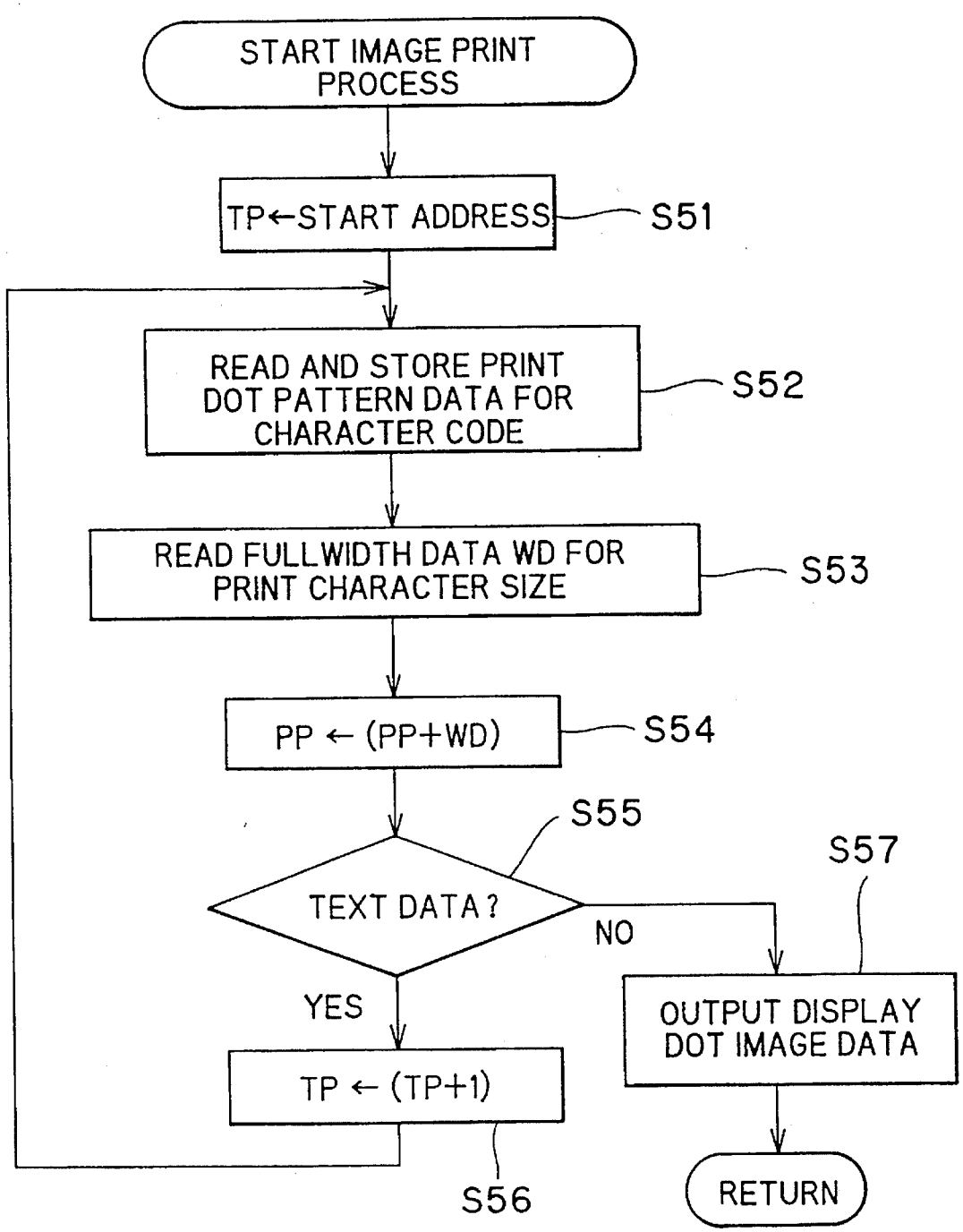
FIG. 16 shows a flowchart of the steps constituting the image print process.

More specifically, as shown in FIG. 16, process steps similar to those of the print image display process of FIG. 9 are conducted in the print process. That is, the start address of the text memory 61 is first set as the text pointer value TP in S51. Then, the start address of the print dot pattern data for the character code, stored in the text memory 61 at the address designated by the text pointer value TP, is read out from the index table TB2 on the basis of the selected print character size data stored in the print character size memory 63. Then, the print dot pattern data is read out from the print CGROM 54 from its start address, and stored into the print data buffer 66 in accordance with the location designated by the print position pointer value PP (which has been initialized to an initial value in the step S10) in S52. Then, the print fullwidth data WD corresponding to the character code is read out from the index table TB2, in accordance with the set print character size data in S53. Illustratively, when the alphabetic letter "A" is inputted and when the print character size is set to 10 point (24 dot size), the print fullwidth data WD10A is retrieved. The print fullwidth data WD10A is then added to the print position pointer value PP to obtain a new print position pointer value PP for the next print position in S54. When S55 judges that some data unprocessed for image print remains in the text memory 61, the text pointer TP is incremented by 1 in S56, and control returns. When all the data stored in the text memory 61 have been processed for image print, the dot image data stored in the print data buffer 66 are serially outputted to the print mechanism PM in S57, with which the corresponding print image is printed on the print tape 19.

Figure 14:
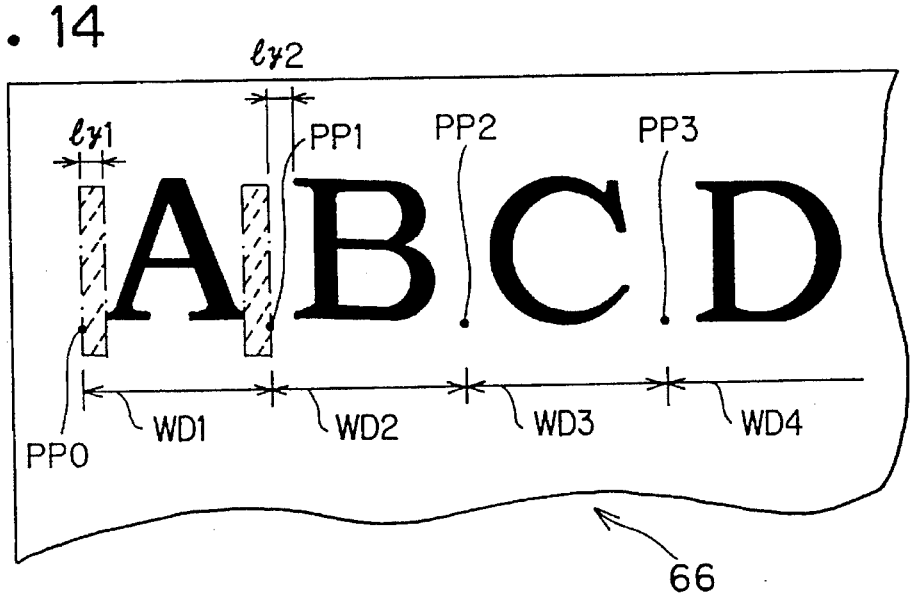
FIG. 14 illustrates an example of the content of the print data buffer storing dot pattern data for the inputted character string.

Assume now that the print character size is set to 13 points and that the alphabetic letter string "ABCD" is inputted, as described with reference to FIGS. 11 through 13. In that case, the print dot pattern data for the character "A" of the 13 points print character size is read out from the CGROM 54. As shown in FIG. 14, thus obtained print dot pattern data is stored into the print data buffer 66 according to a print start position designated by the print position pointer value PP0. The print fullwidth data WD13A for this character "A" is retrieved from the table TB2 and is added to the print position pointer value PP0. This in turn allows the next print position pointer value PP1 to be obtained. Then, print dot pattern data for the next character "B" is retrieved from the CGROM 54 and stored into the print data buffer 66 according to a position determined by the print position pointer value PP1. The display fullwidth data WD13B for the character "B" is then added to the print position pointer value PP1 to obtain a next print position pointer value PP2. Thereafter and in like manner, print dot pattern data for the character "C" is retrieved from the CGROM 54 and stored into the print data buffer 66 according to a position determined by the print position pointer value PP2, and the print dot pattern data for the character "D" is retrieved from the CGROM 54 and stored into the data buffer 66 in accordance with the next print position pointer value PP3.

The print fullwidth data WD for each character represents print area dedicated to the corresponding character. Accordingly, in this example, only the print dot pattern data of character "A" is stored within the print area indicated by the print fullwidth data WD1 between the print positions PP0 and PP1. Similarly, only the data of the character "B" is stored within the print area indicated by the print fullwidth data WD2 between the print positions PP1 and PP2.

It is noted that a left margin Ly is formed between the data of each character and the corresponding print position PP. The width Ly of the left margin for each character is retrieved from the table TB2. As shown in FIG. 14, for the alphabetic letter "B" at the print character size of 13 point (32 dot) size, for example, a left margin Ly2 of a value indicated by the print left margin data Ly13B is formed between the position PP1 and the character "B".

When the two lines of character strings "ABCDEFGH" and "IJKLMMN" are inputted and 13 point print character size is set, print dot pattern data of 13 point size for all the characters are composed, with character pitchs being determined dependently on the print fullwidth data WD on all the characters. The thus composed print dot pattern data are stored in the print data buffer 66. Because the pitches or intervals between the characters are completely determined dependently on the print fullwidth data WD, the total arrangement of the characters is completely the same with that of the characters which is determined completely dependently on the display fullwidth data wd. Dot image data of the composite image of the character strings thus prepared in the print data buffer 66 is printed as shown in FIG. 15 on the tape 19.

Figure 15:
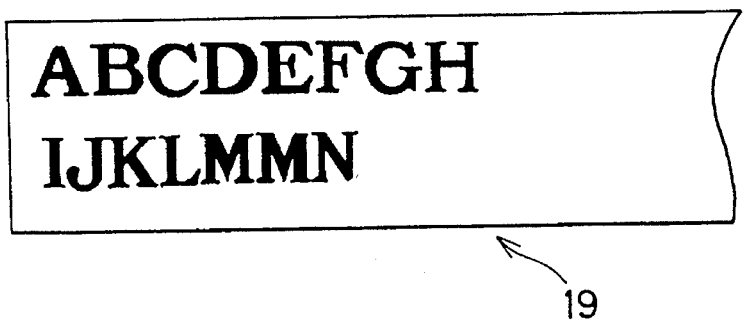
FIG. 15 illustrates how the two inputted character strings are printed on the print tape.

Accordingly, the inputted two character strings "ABCDEFGH" and "IJKLMMN" are printed on the print tape 19 as shown in FIG. 15 in two lines and in the designated print character size. The arrangement of the character strings actually printed on the print tape 19 is substantially the same as what is displayed of the two character strings on the display unit 22 shown in FIG. 13. In this manner, the printlike images of inputted characters are displayed on the display unit 22 in precise correspondence with the actual print positions on the print tape 19.

As shown in FIG. 7, when a key other than the size setting keys, the printable character keys or the print key ("YES" in S13, "NO" in S14 through S16) is operated, the process corresponding to the operated key is carried out. That process when completed is followed by return to step 13.

As described above, when a character key is operated, the tape printer of this example reads display character size data for the inputted character, which corresponds to a selected print character size, in S40. Display dot pattern data corresponding to the starting character code in the text memory is then read out. The thus read out data is stored in the location designated by a display position pointer value of the display data buffer in S42. The print fullwidth data for the inputted character code is then read out in S43 so as to calculate the display fullwidth data for display in S44. The display fullwidth data is added to the display position pointer value to determine the next display position pointer value in S45. The display dot pattern data corresponding to the next character code is placed into the location designated by the next display position pointer value in S42.

Thus, the tape printing apparatus of the present embodiment has the print character generator storing unit, the display character generator storing unit, and the display dot image generating unit. Whereas display dot pattern data for a display character size corresponding to the designated print character size is used to display the inputted characters, the character pitch for display is determined dependently on the display area data which is calculated based on the print area data regarding the corresponding print dot pattern data with regard to the display character size. This allows the printlike images of the inputted characters to be displayed in precise correspondence with the character print positions on the tape.

With the tape printing apparatus of the present invention, the print area data stored in the print character generator storing unit is the print fullwidth data indicative of fullwidths of the inputted characters and their left and righthand margins. This makes it possible to certainly provide the left and right hand margins for each of the characters and symbols and to simplify the data structure as a whole.

While the invention has been described in detail with reference to the specific embodiment thereof, it would be apparent to those skilled in the art that various changes and modifications may be made therein without departing from the spirit of the invention.

For example, the print character size may be temporarily set to the available maximum character size upon initialization of S10, and may be finally set to an appropriate value determined based on the tape width of the print tape 19 and on the number of inputted characters.

The print fullwidth data WD stored in the index table TB2 may be either rectangular dot matrix data indicative of the dedicated areas for the inputted characters, or various area data designating the character pitch for these characters.

More specifically, the ROM may store print area data indicative of print area to be dedicated to each character of each print character size for printing and print positional data indicative of a position of a left-hand bottom end portion of the corresponding character within the corresponding print area. When desired characters and desired print character size are inputted, print area data and print positional data are retrieved from the ROM for the inputted characters at the inputted print character size. The inputted characters will be arranged to be printed, based on the retrieved print area data and print positional data. The retrieved print area data and print positional data are then subjected to a predetermined calculation with a predetermined reduction ratio, to thereby obtain display area data and display positional data for the inputted characters. The display area data for each of the inputted characters indicates display area to be dedicated to each character for displaying, and the display positional data for each of the inputted characters indicates a position of a left-hand bottom end portion of the corresponding character within the corresponding display area. The inputted characters are arranged to be displayed, based on the display area data and the display positional data. The displayed image becomes the same as the image to be printed, because the inputted characters are displayed according to the display area data and the display positional data that are determined based on the print area data and the print positional data.

It is also evident that the invention is applicable to various tape printing apparatuses which, equipped with a keyboard, a display unit and a printer, display inputted text of characters in the display character size corresponding to the selected print character size.

What is claimed is:

1. A tape printing apparatus for printing desired characters onto a tape, the apparatus comprising:

input means for inputting characters, such as letters and symbols, and various commands;

data storage means for temporarily storing data indicative of the characters inputted through the input means;

print character generator storing means for storing, in advance, for a plurality of print character sizes, print dot pattern data of a plurality of characters inputtable through the input means and print area data indicative of print areas dedicated to the corresponding characters;

print dot image generating means for selecting, from the print character generator storing means, print dot pattern data for the inputted character stored in the data storage means, in accordance with a print character size with which the inputted characters are desired to be printed on a tape, the print dot image generating means further selecting, also from the print character generator storing means, print area data for the inputted characters at the desired print character size so as to compose the selected print dot pattern data for the inputted characters into print dot image data where the inputted characters are arranged with a print character interval corresponding to the print area data;

display character generator storing means for storing in advance, for a plurality of display character sizes, display dot pattern data of a plurality of characters inputtable through the input means;

display dot image generating means for selecting, from the display character generator storing means, display dot pattern data for the inputted characters stored in the data storage means, in accordance with a desired display character size, the desired display character size being determined dependently on the desired print character size, the display dot image generating means further reading, from the print character generator storing means, the print area data for the inputted characters at the desired print character size, and obtaining display area data for the inputted characters with respect to the desired display character size based on the read out print area data, the display dot image generating means composing the selected display dot pattern data for the inputted characters into display dot image data where the inputted characters are arranged with a display character interval to which corresponds to the display area data and therefore which corresponds to the print character interval;

display means for receiving the display dot image data so as to display a display dot image where the inputted characters are arranged with the display character interval; and print means for receiving the print dot image data and for printing, on a tape, the print dot image where the inputted characters are arranged with the print character interval.

2. A tape printing apparatus of claim 1, further comprising display character size storing means for storing, in advance, data indicative of display character sizes in correspondence with a plurality of print character sizes, the display dot image generating means selecting the desired display character size from the display character size storing means, in accordance with the desired print character size.

3. A tape printing apparatus of claim 2, wherein the print area data for each of the plurality of characters inputtable from the input means at each print character size includes full-width data indicative of the total width of a width of the corresponding character and widths of left- and right-hand margins to be produced for the corresponding character for printing.

4. A tape printing apparatus of claim 3, wherein the display area data for the inputted characters have values calculated by multiplying the full-width data for the inputted characters with respect to the desired print character size by a ratio of the desired print character size and the desired display character size.

5. A tape printing apparatus of claim 4, wherein the display dot image generating means includes display position calculating means for calculating a display position indicative of a position at which each of the inputted characters are to be displayed, the display position calculating means calculating the display position for each of the inputted characters by adding a value of the display area data for an inputted character preceding to each of the inputted characters to a display position determined for the preceding character, and wherein the print dot image generating means includes print position calculating means for calculating a print position indicative of a position at which each of the inputted characters are to be printed, the print position calculating means calculating the print position for each of the inputted characters by adding the full-width data for an inputted character preceding to each of the inputted characters to a display position determined for the preceding character.

6. A tape printing apparatus of claim 5, further comprising print character size inputting means for inputting the desired print character size.

7. A tape printing apparatus for printing desired characters onto a tape, the apparatus comprising:

input means for inputting characters, such as letters and symbols, desired to be printed on a tape, and a desired print character size, with which the inputted characters are desired to be printed on the tape;

data storage means for temporarily storing data indicative of the characters inputted through the input means;

print character data storing means for storing, in advance, for a plurality of print character sizes, print pattern data of a plurality of characters inputtable through the input means and print area data indicative of print areas dedicated to the corresponding characters;

print area data selecting means for selecting, from the print character data storing means, print area data for the inputted characters at the desired print character size;

print image generating means for selecting, from the print character data storage means, print pattern data for the inputted characters stored in the data storage means, in accordance with the desired print character size, the print image generating means composing the selected print pattern data for the inputted characters into print image data where the inputted characters are arranged at positions determined dependently on the selected print area data;

display character data storing means for storing in advance, for a plurality of display character sizes, display dot pattern data of a plurality of characters inputtable through the input means;

display character size setting means for setting one of the plurality of display character sizes in correspondence with the desired print character size;

display area data calculating means for calculating display area data for each of the inputted characters with respect to the set display character size, the display area data for each inputted character indicating a display area which should be dedicated to the corresponding character at the corresponding display character size for displaying, the display area data for the each inputted character being calculated based on the selected print area data for the corresponding character and relationship between the desired print character size and the set display character size;

display image generating means for selecting, from the display character data storage means, display pattern data for the inputted characters stored in the data storing means, in accordance with the set display character size, the display image generating means composing the selected display pattern data for the inputted characters into display image data where the inputted characters are arranged at positions determined dependently on the calculated display area data;

display means for receiving the display image data so as to display a display image where the inputted characters are arranged at the positions corresponding to the calculated display area data; and print means for receiving the print image data and for printing, on the tape, the print image where the inputted characters are arranged at the positions corresponding to the selected print area data.

8. A tape printing apparatus of claim 7, wherein the print area data stored in the print character data storing means for each of the plurality of characters inputtable from the input means at each print character size has a full-width value indicative of the total width of a width of the corresponding character and widths of left- and right-hand margins to be produced for the corresponding character for printing, the print image generating means composing the selected print pattern data for the inputted characters into the print image data where the inputted characters are arranged at character intervals determined dependently on the full-width values of the print area data selected for the corresponding characters, and wherein the display area data calculated for each of the inputted characters with respect to the set display character size has a full-width value of a display area capable of being occupied by the corresponding character for displaying, the display image generating means composing the selected display pattern data for the inputted characters into display image data where the inputted characters are arranged at character intervals determined dependently on the full-width values of the display area data calculated for the corresponding characters.

9. A tape printing apparatus for printing desired characters onto a tape, the apparatus comprising:

input means for inputting characters, such as letters and symbols, and various commands;

data storage means for temporarily storing data indicative of the characters inputted by the input means;

print character generator storing means for storing, in advance, for a plurality of print character sizes, print dot pattern data of a plurality of characters inputtable through the input means and print area data indicative of print areas dedicated to the corresponding characters;

display character generator storing means for storing in advance, for a plurality of display character sizes, display dot pattern data of a plurality of characters inputtable through the input means;

display dot image generating means for selecting, from the display character generator storing means, display dot pattern data for the inputted characters stored in the data storage means, in accordance with a desired display character size, the desired display character size being determined dependently on the desired print character size, the display dot image generating means further reading, from the print character generator storing means, the print area data for the inputted characters at the desired print character size, and obtaining display area data for the inputted characters with respect to the desired display character size, the display dot image generating means composing the selected display dot pattern data for the inputted characters into display dot image data where the inputted characters are arranged with a display character interval which corresponds to the display area data;

display means for receiving the display dot image data so as to display a display dot image where the inputted characters are arranged with the display character interval; and print means for receiving the print dot pattern data for the inputted characters and for printing, on a tape, a print dot image where the inputted characters are arranged with a print character interval corresponding to the print area data for the inputted characters.

10. A tape printing apparatus of claim 9, wherein the print area data for each of the plurality of characters inputtable from the input means at each print character size includes full-width data indicative of the total width of a width of the corresponding character and widths of left- and right-hand margins to be produced for the corresponding character for printing.

* * * * *